United States Patent [19]
Ohkubo et al.

[11] Patent Number: 4,995,351
[45] Date of Patent: Feb. 26, 1991

[54] VALVE TIMING CONTROL APPARATUS FOR AN INTERNAL COMBUSTION ENGINE

[75] Inventors: Satoru Ohkubo, Amagasaki; Akira Demizu, Himeji, both of Japan

[73] Assignee: Mitsubishi Denki Kabushiki Kaisha, Tokyo, Japan

[21] Appl. No.: 561,022

[22] Filed: Aug. 1, 1990

[30] Foreign Application Priority Data

Nov. 21, 1989 [JP] Japan .................................. 1-304259

[51] Int. Cl.⁵ ............................. F01L 9/04; F01L 1/34
[52] U.S. Cl. .............................. 123/90.11; 123/90.15
[58] Field of Search ............... 123/90.11, 90.15, 90.16, 123/90.17

[56] References Cited

U.S. PATENT DOCUMENTS

| | | | |
|---|---|---|---|
| 4,794,891 | 1/1989 | Knobloch | 123/90.11 |
| 4,805,571 | 2/1989 | Humphrey | 123/90.15 |
| 4,823,825 | 4/1989 | Buchl | 123/90.11 |
| 4,840,159 | 6/1989 | Matsumoto | 123/585 |
| 4,846,120 | 7/1989 | Buchl | 123/90.11 |
| 4,945,870 | 8/1990 | Richeson | 123/90.11 |

FOREIGN PATENT DOCUMENTS

| | | |
|---|---|---|
| 29209 | 8/1974 | Japan . |
| 221433 | 12/1984 | Japan . |
| 80711 | 3/1989 | Japan . |
| 80712 | 3/1989 | Japan . |

Primary Examiner—David A. Okonsky
Assistant Examiner—Weilun Lo
Attorney, Agent, or Firm—Sughrue, Mion, Zinn, Macpeak and Seas

[57] ABSTRACT

A valve timing control apparatus for an internal combustion engine capable of controlling the opening and closing timing of the intake and exhaust valves with a high degree of preciseness, as well as improving the air-intake and exhaust-discharge efficiency of the engine for increased engine output power. To this end, the valve timing control apparatus includes a pressure sensor for sensing the internal pressure in an engine cylinder, a crank angle sensor for sensing the crank angle of the engine, a valve timing detector for detecting the opening and closing timings of the intake and exhaust valves from the sensed cylinder internal pressure and the sensed engine crank angle, a disabling element for disabling the operation of the valve timing detector during combustion periods of the engine, a valve timing storage element for storing basic valve opening and closing timings for the intake and exhaust valves which are predetermined based on the operating conditions of the engine, a comparison element for comparing the detected valve opening and closing timings as detected by the valve timing detector and the predetermined valve opening and closing timings stored in the valve timing storage element so as to calculate deviations therebetween, and a valve timing control element for controlling the opening and closing timings of the intake and exhaust valves in accordance with the deviations thus calculated in such a manner that the actual opening and closing of the intake and exhaust valves take place at the predetermined basic valve opening and closing timings.

2 Claims, 5 Drawing Sheets

VALVE TIMING CONTROL APPARATUS FOR AN INTERNAL COMBUSTION ENGINE

BACKGROUND OF THE INVENTION

The present invention relates to a valve timing control system for an internal combustion engine which controls the opening and closing of intake and exhaust valves using a pressure sensor which senses the internal pressure in an engine cylinder.

Control apparatuses for controlling ignition timing or the quantity of fuel to be injected for an internal combustion engine in response to the internal pressure in an engine cylinder have been known. A typical example of such an ignition timing control apparatus is disclosed in Japanese Patent Publication No. 49-29209 in which peak crank positions of a piston in an engine cylinder at which the internal pressure in the engine cylinder takes a peak value are detected, and ignition timing of the cylinder is controlled in a feedback manner so as to make the peak pressure take place at prescribed piston position. Another typical example of such a fuel injection control apparatus is disclosed in Japanese Laid-Open No. 59-221433 in which the quantity of fuel to be injected into an engine cylinder is controlled based on the amount of intake air to be sucked therein which is calculated from the pressure differential between the cylinder internal pressure at bottom dead center of the piston during intake stroke and the cylinder internal pressure at a predetermined crank angle of the piston during compression stroke.

Further, it is well known that changing the opening and closed timings for the intake and exhaust valves of an engine depending upon the engine operating ranges results in improvements in the operating performance of the engine. Example of this are shown in Japanese Patent Laid-Open Nos. 64-80711 and 65-80712.

With the above-described conventional engine control apparatuses, however, valve timing control is performed in an open-loop manner, and hence accuracy in detecting the valve opening and closing timings is inadequate, so it is impossible to control the valve opening or closing timings with a high degree of preciseness.

SUMMARY OF THE INVENTION

Accordingly, the present invention is intended to obviate the above-described problems of the conventional engine control apparatuses.

It is an object of the present invention to provide a valve timing control apparatus for an internal combustion engine which is able to control the opening and closing timing of ther intake and exhaust valves with a high degree of preciseness.

Another object of the present invention is to provide a valve timing control apparatus for an internal combustion engine which is able to improve the air-intake and exhaust-discharge efficiency of the engine, thereby increasing engine output power.

In order to achieve the above objects, according to the present invention, there is provided a valve timing control apparatus for an internal combustion engine equipped with an intake valve and exhaust valve, the valve timing control apparatus comprising:

a pressure sensor for sensing the internal pressure in an engine cylinder;

a crank angle sensor for sensing the crank angle of the engine;

valve timing detecting means for detecting the opening and closed timings of the intake and exhaust valves from the sensed cylinder internal pressure and the sensed engine crank angle;

disabling means for disabling the operation of the valve timing detecting means during combustion periods of the engine;

valve timing storage means for storing basic valve opening and closing timings for the intake and exhaust valves which are predetermined based on the operating conditions of the engine;

comparison means for comparing the detected valve opening and closing timings as detected by the valve timing detecting means and the predetermined valve opening and closing timings stored in the valve timing storage means so as to calculate deviations therebetween; and valve timing control means for controlling the opening and closing timings of the intake and exhaust valves in accordance with the deviations thus calculated in such a manner that the actual opening and closing of the intake and exhaust valves take place at the predetermined basic valve opening and closing timings.

Preferably, the disabling means operates to suspend the operation of the valve timing detecting means for a period of time from a prescribed crank angle before top dead center to another prescribed crank angle after top dead center on each combustion stroke of the engine.

The above and other objects, features and advantages of the present invention will become more readily apparent from the following detailed description of a preferred embodiment of the invention taken in conjunction with the accompanying drawings.

DESCRIPTION OF THE PREFERRED EMBODIMENT

The present invention will now be described in detail with reference to a preferred embodiment thereof as illustrated in the accompanying drawings.

Figure 1:
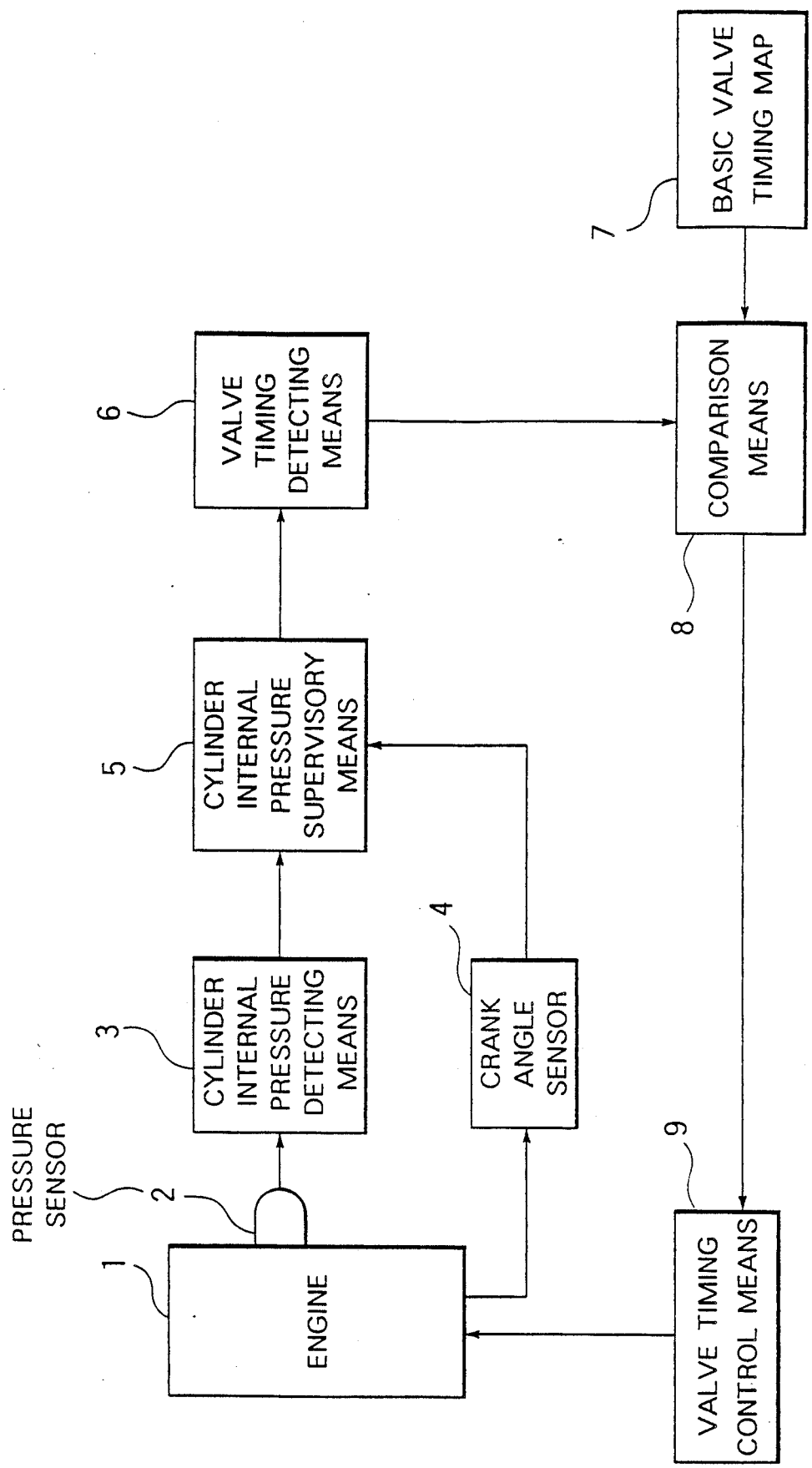
FIG. 1 is a block diagram illustrating the conceptional construction of a valve timing control apparatus for an internal comustion engine in accordance with the present invention.

Referring to the drawings and first to FIG. 1, there is shown the general conception of a valve timing control apparatus for an internal combustion engine in accordance with the present invention. The apparatus illustrated includes an engine cylinder 1, a pressure sensor 2 for sensing the internal pressure in the engine cylinder 1, a pressure detecting means 3 for detecting the internal pressure in the engine cylinder 2 from the output signal of the pressure sensor 2, a crank angle sensor 4 for generating a pulse signal, e.g., generating 360 pulses per revolution of the engine crank shaft, a cylinder pressure supervisory means or disabling means 5 for supervising the internal pressure in the engine cylinder 1, a valve timing detecting means 6 for detecting the opening and closing timings of the intake and exhaust valves of the engine, a basic valve timing map 7, a comparison means 8 for comparing the valve opening and closing timings detected by the valve timing detecting means 6 with the basic valve timing map 7, and a valve timing control means 8 for controlling the opening and closing timings of the intake and exhaust valves based on the output of the comparison means 8.

Figure 4:
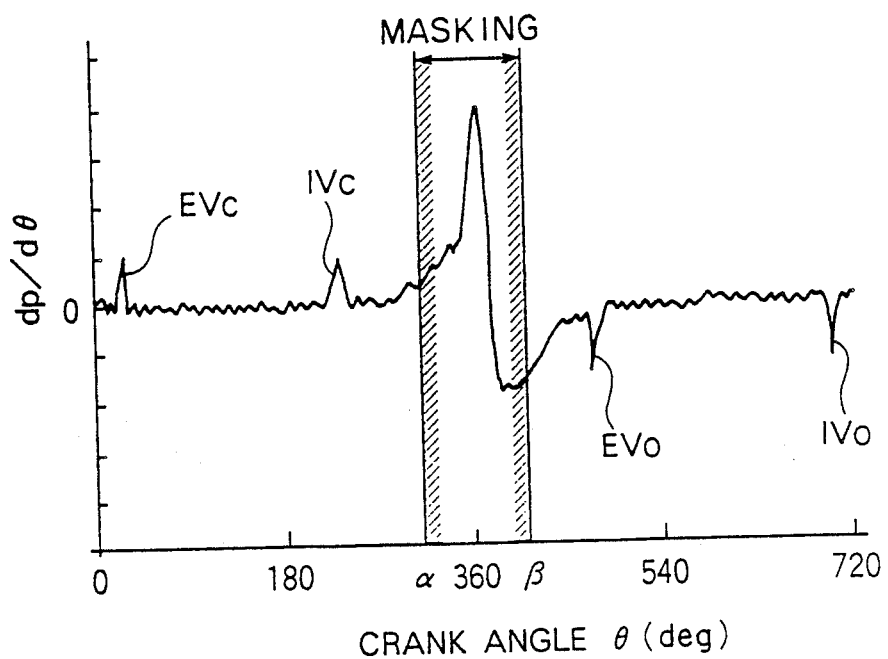
FIG. 4 is a graphic representation showing the relationship between the change rate of the cylinder internal pressure and the crank angle of the engine.

In operation, the cylinder pressure supervisory means 5 receives the output signal of the cylinder pressure detecting means 3 and the output signal of the crank angle sensor 4 and calculates, based on these signals, a change rate dP/dO of the internal pressure P in the engine cylinder 1 relative to the crank angle of the piston in the engine cylinder 1, as illustrated in FIG. 4 in which EVc represents the closing point of the exhaust valve, IVc the closing point of the intake valve, EVo the opening point of the exhaust valve, and IVo the opening point of the intake valve. The valve timing detecting means 6 detects the opening and closing timings of the intake and exhaust valves from the output signal of the cylinder internal pressure supervisory means 5. In this regard, the cylinder internal pressure supervisory means 5 also acts as a disabling means for disabling the operation of the valve timing detecting means during combustion periods of the engine. The comparison means 8 compares the opening and closing timings of the intake and exhaust valves as detected by the valve timing detecting means 6 with the predetermined valve opening and closing timings as read from the basic valve timing map 7, and calculates deviations therebetween and sends them to the valve timing control means 9. The valve timing control means 9 controls the operation of the engine cylinder 1 in a feedback manner so that the actual opening and closing of the intake and exhaust valves take place at the prescribed timings.

Figure 2:
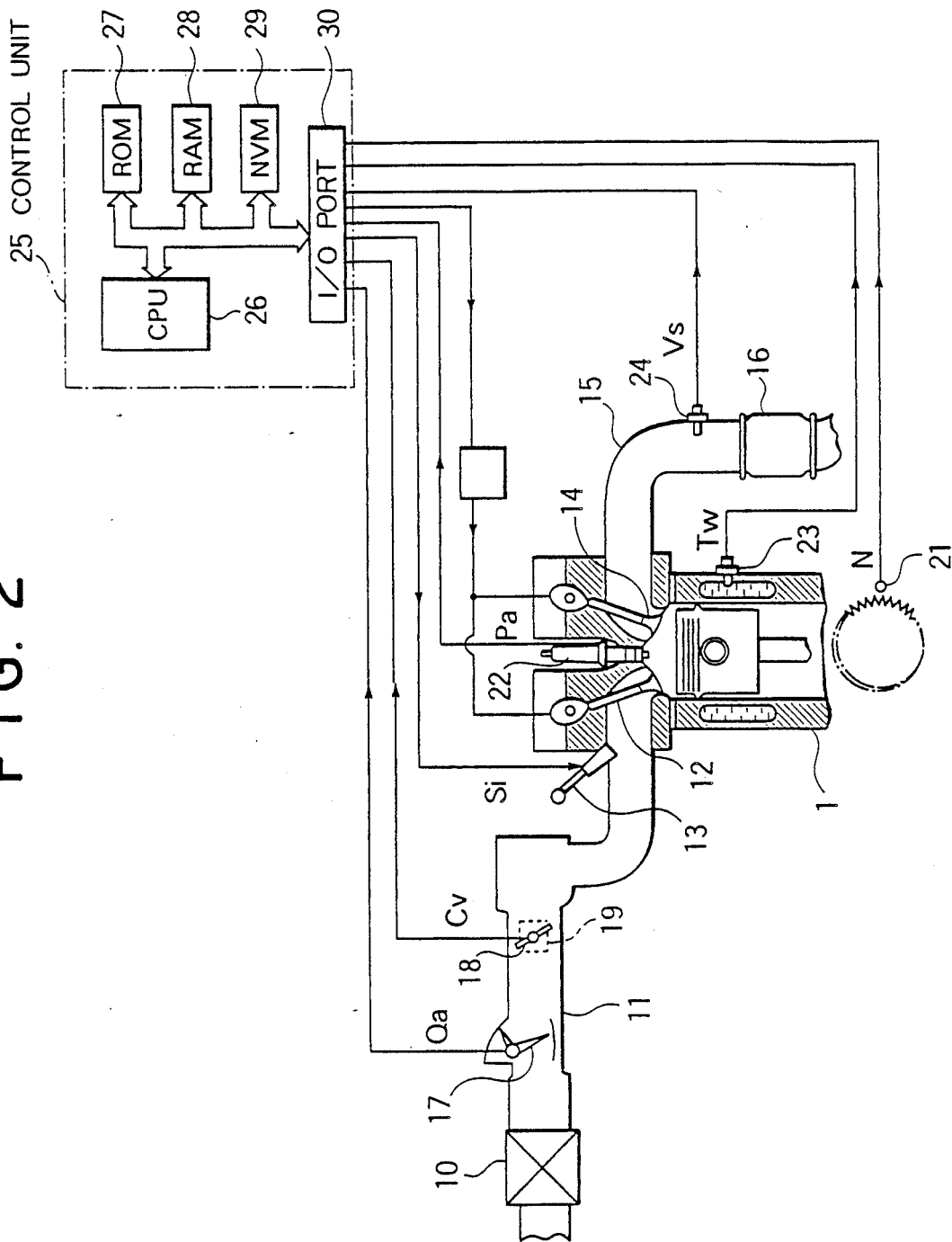
FIG. 2 is a view showing a concrete construction of a valve timing control apparatus embodying the conceptional construction of FIG. 1.

FIG. 2 shows a more concrete embodiment of the present invention. In this embodiment, intake air is supplied to an engine cylinder 1 through an air cleaner 10 and an intake pipe 11, and fuel is injected by a fuel injector 13 into the intake pipe 11 based on an injection signal Si from a control unit 25 which will be described in detail later. The fuel thus injected forms an air/fuel mixture in the intake pipe 11 which is supplied to the engine cylinder 1 upon opening of the intake valve 12 and ignited there by a spark plug 22 installed on the cylinder head. The mixture in the engine cylinder 1 is thus combusted and then discharged therefrom as an exhaust gas to an exhaust pipe 15 upon opening of the exhaust valve 14. The exhaust gas then flows into a catalytic converter 16 wherein harmful components such as CO, HC, NOx, etc. in the exhaust gas are purified by a three-way catalyst contained therein. The exhaust gas thus purified is discharged from the catalytic converter 16 to the ambient atmosphere. The quantity of intake air Qa sucked into the engine cylinder 1 is detected by an air flow meter 17 and controlled by a throttle valve 18 disposed in the intake pipe 11. The degree of opening Cv of the throttle valve 18 is sensed by a throttle sensor 19. The opening and closing timings of the intake and exhaust valve 12, 14 are sensed by a pressure sensor 20 and a crank angle sensor 21.

Figure 5A:
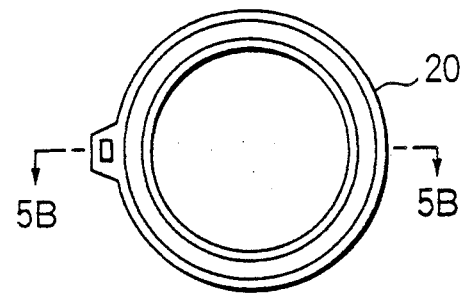
FIG. 5(A) is a plan view of a pressure sensor of the present invention.
Figure 5B:
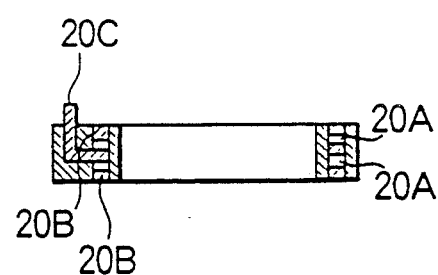
FIG. 5(B) is a cross section taken along the line 5B—5B in FIG. 5(A)
Figure 5C:
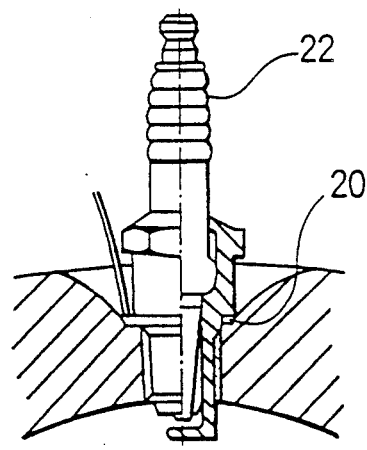
FIG. 5(C) is a partially cross-sectional view showing the mounting state of the pressure sensor of FIGS. 5(A) and 5(B).

The pressure sensor 20 is in the form of a washer-type pressure sensor, as clearly shown in FIGS. 5(A) and 5(B), which is mounted around the spark plug 22 in the head of the engine cylinder 1 in the manner as shown in FIG. 5(C). As clearly seen from FIG. 5(B), the washer-type pressure sensor 20 has a pair of annular piezoelectric elements 20A, a pair of annular negative electrodes 20B disposed on the outer sides of the piezoelectric elements 20A, and a positive electrode interposed between the piezoelectric elements 20A and having an externally extended terminal lead. The piezoelectric elements 20A sense, through the spark plug 22, a change dP in the internal pressure P in the engine cylinder 1 which takes place upon the opening and closing of the intake and exhaust valves 12, 14, and generates an analog output signal Pa having a voltage corresponding to the sensed pressure change dP.

The crank angle sensor 21 senses the crank angle $\theta$ of the piston in the engine cylinder 1, and the crank angle at which the pressure change dP in the cylinder internal pressure P takes place is detected by the control unit 25 so as to control the opening and closing timings of the intake and exhaust valves 12, 14 in a precise manner. The crank angle sensor 21 also senses the number of revolutions per minute of the engine N. A temperature sensor 23 senses the temperature Tw of an engine coolant such as coolng water flowing through a water jacket formed in the engine cylinder 1. An oxygen sensor 24 senses the concentration of oxygen contained in the exhaust gas discharged from the engine cylinder 1, and to this end, it has a characteristic in which the output thereof abruptly changes when the air/fuel ratio of the mixture changes across the stoichiometric value.

The air flow meter 17, the throttle sensor 19 and the crank angle sensor 21 together constitute an engine operating condition detecting means, and the output signals of these sensors are inputted to the control unit 25 together with the output signals of the pressure sensor 20, the temperature sensor 23 and the oxygen sensor 24. The control unit 25 shares with the pressure sensor 20 the valve timing detecting function, and has by itself an air/fuel ratio setting function and an air/fuel ratio correcting function.

The control unit 25 includes a central processing unit (CPU) 26, a read only memory (ROM) 27, a random access memory (RAM) 28, a non-volatile memory (NVM) 29 and an input/output (I/0) port 30. The CPU 26 takes in external data as necessary from the I/O port in accordance with a program stored in the ROM 27, transmits data between the RAM 28 and the NVM 29, and determines whether the opening and closing timings of the intake and exhaust valves 12, 14 are optimal. Based on the result of such determination of the valve timings, the CPU 26 performs calculations for properly controlling the opening and closing timings of the intake and exhaust valves 12, 14, and outputs the resultant data of calculations to the I/O port 30 as required. The valve timing control means 31 receives the data from the I/O port 30 and properly controls, based thereupon, the opening and closing of the intake and exhaust valves 12, 14. In this regard, predetermined optimal valve opening and closing timings are stored in the NVM 29 in an appropriate form such as a map.

Figure 3:
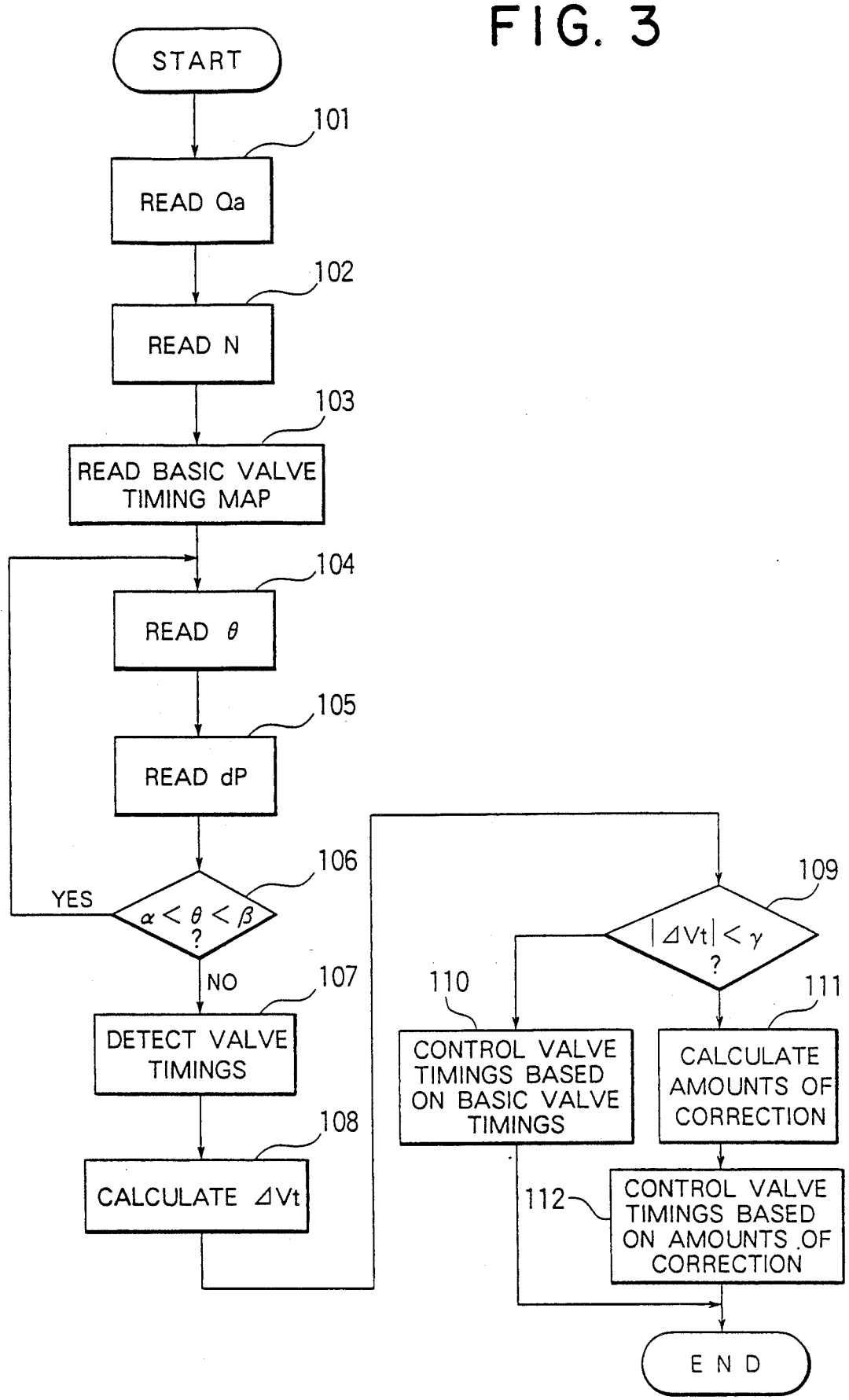
FIG. 3 is a flow chart showing the operating process of the valve timing control apparatus of FIG. 2.

Next, the operation of the valve timing control apparatus of FIG. 2 will be described in detail while referring to the flow chart of FIG. 3. A program for performing the processing steps as illustrated in the flow chart of FIG. 3 is stored in the ROM 27 and executed in synchrony with the rotation of the engine. First, in Step 101, the quantity of intake air Qa is read in from the output signal of the air flow meter 17, and in Step 102, the number of revolutions per minute of the engine N is calculated based on the time interval between the successive basic signals (i.e., the time between successive signals generated by the crank angle sensor 21 every 360 degrees of the crank angle), or the number of pulses per a predetermined time of a position signal (which is issued by the crank angle sensor 21 every 1 degree of the crank angle). The time interval or the number of pulses is measured from the output signal of the crank angle sensor 21. Then in Step 103, the values for the basic valve timings such as IVo (intake valve opening timing), IVc (intake valve closing timing), EVo (exhaust valve opening timing) and EVc (exhaust valve closing timing) are read in from a two-dimensional table map which is stored in the NVM 29, the map having, as parameters, the quantity of intake air Qa and the number of revolutions per minute of the engine N. In Step 104, the crank angle $\theta$ is read in from the output signal of the crank angle sensor 21, and in Step 105, the quantity of change dP in the cylinder internal pressure P is read in from the output signal of the pressure sensor 20. In Step 106, in order to prevent incorrect detection of the valve opening and closing timings due to knocking and the like, a certain interval such as, for example, the interval from 40 degrees before top dead center (the crank angle of a $\alpha$ degrees in FIG. 4) to 40 degrees after top dead center (the crank angle of $\beta$ degrees in FIG. 4) during the compression stroke, in which combustion takes place, is masked so that detection of the valve timings is suspended or halted. That is to say, in Step 106, it is determined whether $\alpha < \theta < \beta$, and if the answer is YES, then the program returns to Step 104. On the other hand, if the answer is NO, the program goes to Step 107 where the valve opening and closing timings are detected. In this case, detection of the valve timings is done by detecting the crank angle at which an abrupt change in the value of dP/dO takes place. In Step 108, a deviation $\Delta Vt$ between each of the thus detected values and the corresponding one of the predetermined basic values for valve opening and closing timings is calculated, and then in Step 109, it is determined whether each $\Delta Vt$ falls within an allowable range $\gamma$. If the answer is YES, the valve opening and closing timings are determined to be correct and the program goes to Step 110 where the valve opening and closing timings are controlled based exactly on the basic valve timings determined from the basic valve timing map. On the other hand, if the answer is NO, the program goes to Step 111 where appropriate amounts of correction for properly correcting the valve timings are calculated. Then in Step 112, the valve opening and closing timings are correctively controlled based on the thus calculated amounts of correction in a feedback manner.

Although in the above-described embodiment, the engine having a single cylinder is described, the present invention is applicable to a multi-cylinder engine having two or more cylinders. Also, the quantity of intake air Qa is detected by the air flow meter 17, it can be calculated from the pressure differential in the cylinder internal pressure at two arbitrary points during comprssion stroke. In addition, based on the cylinder internal pressure, other information can be calculated such as an average effective pressure in the engine cylinder, a heat generation rate, a peak-pressure generation position at which a peak in the cylinder internal pressure takes place, so that the information thus calculated is utilized for controlling other engine control devices such as a fuel controller, an ignition controller, an exhaust gas recirculation (EGR) controller and the like.

As described in the foregoing, according to the present invention, the opening and closing timings of the intake and exhaust valves are detected based on the internal pressure in the engine cylinder and the crank angle of the engine, both of which are closely related to the valve opening and closing timings, so that the accuracy in the detection of the valve opening and closing timings is greatly improved. Further, the valve opening and closing timings are controlled in a feedback manner in accordance with the deviations between the detected values of the valve opening and closing timings and the predetermined basic values. This leads to further improvements in the accuracy of controlling the valve opening and closing timings. As a result, the air-intake efficiency and the exhaust-discharge efficiency of the engine can be improved, thus increasing the output power of the engine. In addition, during the combustion periods in which engine knocking is liable to occur, detection of the valve opening and closing timings is suspended so as to prevent reduction in accuracy of the valve opening and closing timing control due to incorrect or erroneous detention of the valve timings.

What is claimed is:

1. A valve timing control apparatus for an internal combustion engine equipped with an intake valve and exhaust valve, said valve timing control apparatus comprising:
   a pressure sensor for sensing the internal pressure in an engine cylinder;
   a crank angle sensor for sensing the crank angle of the engine;
   valve timing detecting means for detecting the opening and closing timings of the intake and exhaust valves from the sensed cylinder internal pressure and the sensed engine crank angle;
   disabling means for disabling the operation of said valve timing detecting means during combustion periods of the engine;
   valve timing storage means for storing basic valve opening and closing timings for the intake and exhaust valves which are predetermined based on the operating conditions of the engine;
   comparison means for comparing the detected valve opening and closing timings as detected by said valve timing detecting means and the predetermined valve opening and closing timings stored in said valve timing storage means so as to calvulate deviations therebetween; and
   valve timing control means for controlling the opening and closing timings of the intake and exhaust valves in accordance with the deviations thus calculated in such a manner that the actual opening and closing of the intake and exhaust valves take place at the predetermined basic valve opening and closing timings.

2. A valve timing control apparatus for an internal combustion engine as claimed in claim 1, wherein said disabling means operates to suspend the operation of said valve timing detecting means for a period of time from a prescribed crank angle before top dead center to another prescribed crank angle after top dead center on each combustion stroke of the engine.

* * * * *